United States Patent [19]

Fratta

[11] Patent Number: 4,888,513

[45] Date of Patent: Dec. 19, 1989

[54] RELUCTANCE ELECTRIC MACHINE HAVING A DECREASED CROSS SECTION OF ROTOR FERROMAGNETIC MATERIAL

[76] Inventor: Antonino Fratta, Via Levanna 27, I-10143, Torino, Italy

[21] Appl. No.: 186,091

[22] Filed: Apr. 19, 1988

[30] Foreign Application Priority Data

Apr. 30, 1987 [IT] Italy ............................ 67374 A/87

[51] Int. Cl.[4] ............................................. H02K 19/06
[52] U.S. Cl. ...................................... 310/216; 310/42; 310/166; 310/261
[58] Field of Search ............... 310/216, 261, 269, 166, 310/168, 217, 256, 269, 42

[56] References Cited

U.S. PATENT DOCUMENTS

| | | | |
|---|---|---|---|
| 2,769,108 | 10/1936 | Risch | 310/265 |
| 3,062,979 | 11/1962 | Jarret et al. | 310/168 |
| 3,671,789 | 6/1972 | Menzies | 310/163 |
| 3,921,017 | 11/1975 | Hallerbäck | 310/216 |
| 4,459,502 | 7/1984 | EL-Antably | 310/217 |
| 4,644,210 | 2/1987 | Meisner et al. | 310/211 |
| 4,712,027 | 12/1987 | Karidis | 310/12 |

FOREIGN PATENT DOCUMENTS 1114562  5/1968  United Kingdom .

Primary Examiner—Patrick R. Salce
Assistant Examiner—D. L. Rebsch
Attorney, Agent, or Firm—Young & Thompson

[57] ABSTRACT

A reluctance electric machine which comprises a stator with electric windings, a rotor including ferromagnetic material members, inserted into the stator and separted therefrom by an air gap, and members of non-ferromagnetic material inserted in the rotor in such a way that the cross section of the ferromagnetic material members of the rotor, at least near the air gap, is decreased by the insertion of the members of non-ferromagnetic material in such a way that the ratio between the ferromagnetic material cross section and the whole cross section available does not exceed 0.6, and the ratio between at least one linear dimension of the non-ferromagnetic material members, lying in a plane tangent to the air gap, and the thickness of the machine air gap, does not exceed 5. The electric machine is fed by an electronic circuit for vectorial control (in amplitude and phase) of the current feeding the electric windings of the stator. The rotor may be massive with salient poles, and then the members of non-ferromagnetic material are little cavities hollowed in the surfaces of the rotor which face the air gap. Alternatively, the rotor may have axial laminations, and then the laminations comprise ferromagnetic sheets and alternate non-ferromagnetic intercalary layers, where the thickness of each intercalary layer is at least ⅔ of thickness of each ferromagnetic sheet, and the thickness of each intercalary layer does not exceed 5 times the thickness of the machine air gap.

6 Claims, 3 Drawing Sheets

RELUCTANCE ELECTRIC MACHINE HAVING A DECREASED CROSS SECTION OF ROTOR FERROMAGNETIC MATERIAL

BACKGROUND OF THE INVENTION

This invention refers to a reluctance electric machine with a rotor comprising members of ferromagnetic material, inserted into a stator having electric windings, and separated therefrom by an air gap.

The reluctance electric machines are synchronous machines comprising a stator with a customary polyphase, distributed winding having two or more poles, substantially similar to that of an induction machine, and a rotor free from windings and permanent magnets, whose number of poles is equal to the number of poles of the stator, and whose structure is anisotropic. The anisotropy of the rotor is so carried out that the rotor shows, for each pair of poles of the machine, a direction of minimum reluctance, the so called direct axis, and a direction of maximum reluctance, the so called quadrature axis, which is situated at a distance of 90 electric degrees from the direct axis. When a magnetomotive force is generated by the suitably fed stator windings, the rotor tends to displace its direct axis of minimum reluctance until it is aligned with the magnetomotive force generated by the stator, and this generates a utilizable mechanical couple. Particularly, when the stator generates a rotating field, this couple is suitable for keeping the rotor in synchronous rotation with respect to the rotating field, with a phase angle, subtended between the direct axis and the axis representing the stator field, whose amplitude and sign depend on the value of the couple itself. The thus generated utilizable couple depends on the degree of anisotropy of the rotor, and therefore it is interesting to render the ratio between the rotor permeance along the direct axes, and its permeance along the quadrature axes, to be maximal. This may be done in various ways, namely by constructing the rotor in massive form with salient poles, or by means of stacks of profiled ferromagnetic sheets superimposed along the direction of the rotation axis (transverse lamination: see for example U.S. Pat. No. 2,769,108), or even by inserting in the rotor suitably oriented ferromagnetic sheets having one of their main dimensions parallel to the rotation axis (axial lamination: see for example the British Pat. No. 1,114,562).

The reluctance electric machines have been operated until now by controlling the voltage of the stator electrical feed, and starting has been obtained by inserting in the rotor suitable members acting as a squirrel-cage. In this way, the machine starts as an asynchronous motor by action of the squirrel-cage members and, when the rotor attains a rotational speed near that of the rotating field generated by the stator, the anisotropy of the rotor produces a hooking; after that the operation continues with a synchronous character.

Consistently with this manner of use, in developing these electric machines, the trend has been until now to increase the permeance ratio, mainly by increasing the rotor reluctance along the quadrature axes, by means of slots or inclusions of non-ferromagnetic material, so oriented as to cut the magnetic flux lines which extend along the quadrature axes, though having care to cause the minimum possible decrease of the effective cross section of ferromagnetic material available for the magnetic flux lines extending along the direct axes, in order that during operation no saturation of the ferromagnetic material of the rotor took place. Such requirement arises from a saturation of the ferromagnetic material of the rotor being unfavorable during the asynchronous starting phase of operation, whereas it would be of no aid during the synchronous operation. From such premises result some difficulties and high costs of manufacture, a relatively low power factor, and an excessively low ratio between the generated couple and the size of the machine. These drawbacks have limited the propagation of the reluctance machines.

BRIEF SUMMARY OF THE INVENTION

The object of this invention is to open new application fields to reluctance electric machines, as well as to allow realizing machines having high characteristics and a simple and economical construction, by starting from the idea of using such machines under electronic vectorial control of the feed current. This kind of controlled feed is per se well known for other types of electric machines, but until now it has not been employed in connection with reluctance machines particularly designed for such type of feed. A substantial consequence of the application of this idea is that the problem of a starting asynchronous phase of operation no longer exists and therefore, on one hand, there is no longer a need for inserting members acting as a squirrel-cage, and on the other hand there is no longer any need for avoiding saturation of the ferromagnetic material of rotor.

Under such premises, the further idea on which the invention is based is that of systematically leading the ferromagnetic material of the rotor, in the operation conditions of whole load and at least in the regions contiguous to the machine air gap, to the magnetic saturation conditions, though causing no noticeable local magnetic saturation in the ferromagnetic material forming the stator, which would lead to great energy losses, to some waviness in the generated couple and to undesired mechanical stresses.

This idea is embodied, according to the invention, in that the cross section of the ferromagnetic material members of rotor, at least near the air gap, is decreased by the insertion of members of non-ferromagnetic material, in such a way that the ratio between the ferromagnetic material cross section, and the whole cross section, does not exceed 0.6, and the ratio between at least one linear size of the non-ferromagnetic material members, lying in a plane tangent to the air gap, and the thickness of the machine air gap, does not exceed 5.

Thanks to the fact that in such a unique feature the cross section of ferromagnetic material available for the induction flux along the direct axes does not exceed 6/10 of the material cross section present, when a usual, non-saturating value of the induction is generated in the ferromagnetic material of the stator, a saturation of the ferromagnetic material of the rotor is obtained, whereby the rotor, for any further increase of the flux, behaves as a permanent magnet rotor. On the other hand, thanks to the fact that the size of the non-ferromagnetic material members present within the rotor does not exceed, near the air gap and in at least one direction lying in a plane tangent to the air gap, five times the thickness of the air gap, no noticeable local concentration of induction is caused in the stator poles, and therefore the stator material is not locally led to saturation conditions.

It should be remarked that a machine according to the invention, having the above features, would not show a favorable behavior under voltage controlled feed, so much the less in conditions of asynchronous operation, and for this reason it is suitable that an operation under feed with vectorial control of the feed current, and therefore an always synchronous operation, is provided for this machine.

Constructively, the features according to the invention may be embodied in a rotor in different manners. A first manner, suitable for a salient pole rotor made of massive ferromagnetic material, comprises hollowing a number of little cavities, for example thin millings, in the rotor surfaces facing the air gap, thus obtaining the desired decrease of the ferromagnetic material cross section. Another manner, suitable for an axially laminated rotor, comprises forming the laminated stacks of rotor from ferromagnetic material sheets alternated with non-ferromagnetic layers, wherein the thickness of the non-ferromagnetic layers is at least ⅔ of the thickness of the ferromagnetic sheets.

As already said, the saturation of at least a part of the ferromagnetic material of the rotor is desired as a characteristic of the invention in the conditions of whole load operation, but of course it may not be verified in the conditions of operation with reduced load, namely when the machine operates under a weakened magnetic field. However, even in the use of machines according to the invention in applications which involve working conditions even mainly with reduced magnetic flux, which do not give rise to saturation phenomena, when the geometry shows axial lamination, a high decrease in ferromagnetic section leads to a significant quality factor in the coupling between the machine and the feeding circuitry. Such a characteristic of an axial lamination with a high decrease in ferromagnetic section is due to the high reluctance which is obtained along the quadrature axis, and which is nearly proportional to the decrease factor and is scarcely sensible to the saturation. On the contrary, with a massive structure, the reluctance along the quadrature axis is sufficiently great, for little variations of the field, only in the presence of saturation of the ferromagnetic material of rotor, and therefore it becomes considerably lower when the machine field is weakened.

BRIEF DESCRIPTION OF THE DRAWINGS

These and other characteristics of the subject of the invention will appear more clearly from the following description of some embodiments, referred to by way of non-limitative examples and diagrammatically shown in the appended drawings, wherein.

DETAILED DESCRIPTION OF THE PREFERRED EMBODIMENTS

In FIGS. 1 to 7 of the drawings, the structure of the stator S has not been detailed because use may be made of any kind of stator, per se known for the type of machines referred to or for other types of electric synchronous or asynchronous machines. In most cases, but without prejudice, it will be a structure with distributed polyphase windings. It should be noted that the specific stator structure has, per se, no connection with the application of the invention.

Figure 8:
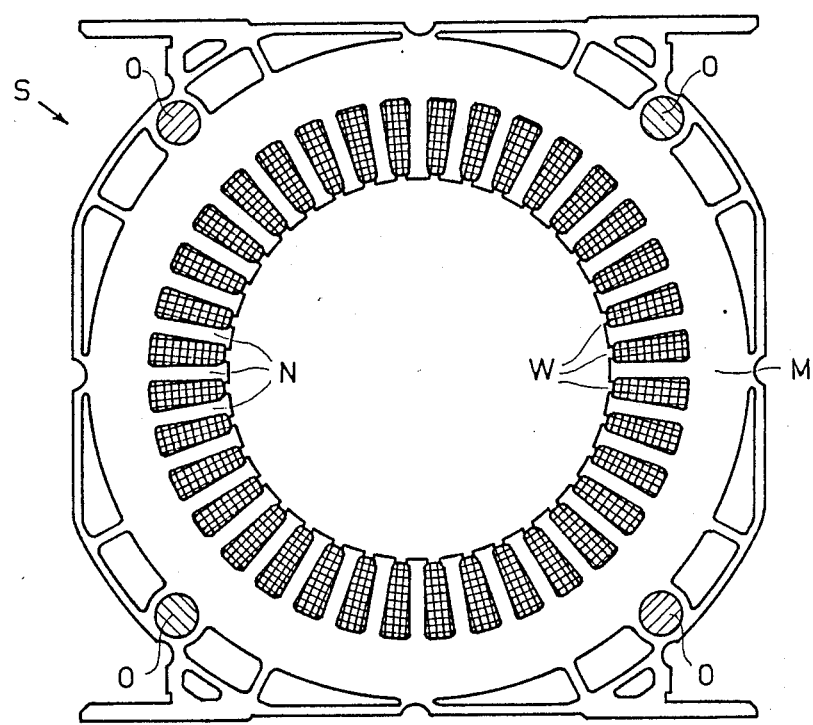
FIG. 8 shows the cross section of a stator structure which may be used with the rotor structure according to any of the foregoing figures.

For more complete information, however, an example of a stator structure S which may be used with the machine of the invention is shown in FIG. 8. The stator S comprises a stack of ferromagnetic sheets M forming a magnetic yoke, assembled by means of bolts O. Each ferromagnetic sheet M forms a number of teeth N and between each pair of adjacent teeth a slot, wherein wires forming a polyphase distributed electric winding W are inserted.

Figure 1:
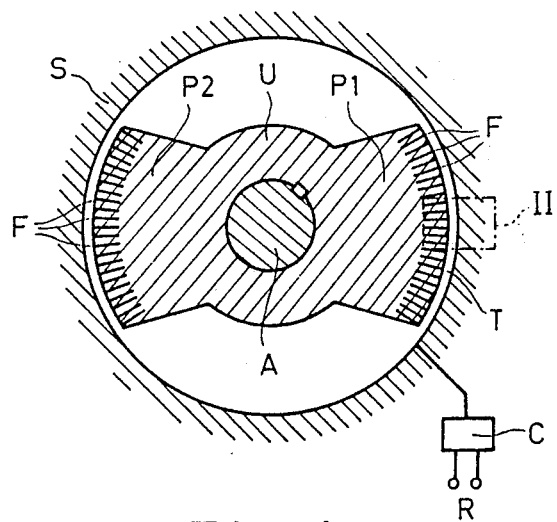
FIG. 1 diagrammatically shows the cross section of a massive rotor whose section is decreased in correspondence of the air gap.
Figure 3:
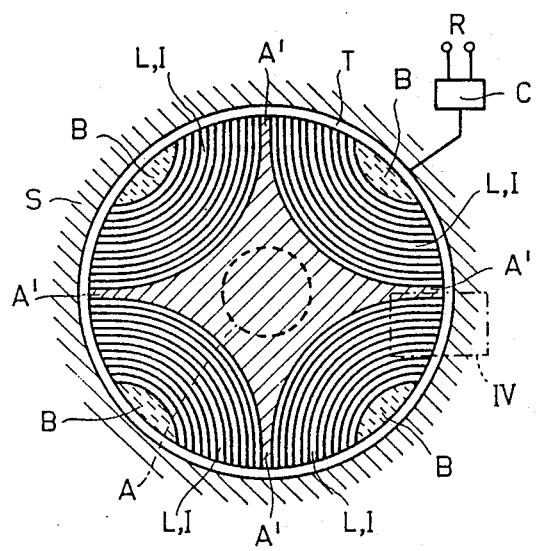
FIG. 3 diagrammatically shows the cross section of a rotor having an axial lamination with decreased section.

The FIGS. 1 and 3 diagrammatically show that the stator S is connected to a feed circuit C, interposed between the stator S and a feed line R. The feed circuit C should be intended as an electronic circuit for the vectorial control (in amplitude and phase) of the current feeding the stator S. The structure of circuit C is no longer detailed in the figures because such control circuits are per se known in the application to other types of electric machines, and in general any circuit of this kind may be used according to the idea of the invention, which under this point of view is only characterized by the peculiar application according to which a circuit C for vectorial control of the feeding current, per se known, is applied to control the current feeding the stator S, even per se known, of a reluctance electric machine particularly designed for such feeding.

Figure 9:
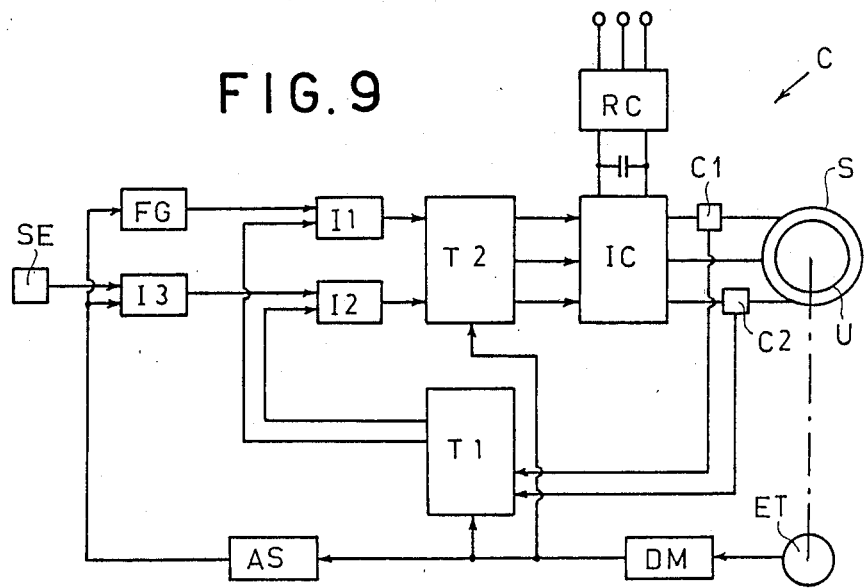
FIG. 9 shows the block diagram of an electronic circuit for the vectorial control of the current feed the machine.

For more complete information, however, an example of a suitable feed circuit C is shown by the block diagram of FIG. 9. Circuit C includes a rectifier circuit RC fed by the alternate current line R and feeding an inverter circuit IC which in turn feeds the stator S of the electric machine. The rectifier circuit RC may include a step-up chopper for power regeneration on line R or dissipation on a braking resistance. The inverter circuit IC may include transistors and operate on all four quadrants. The rotor U of the machine is mechanically connected to an angular transducer ET, for example a resolver, and the signal produced by the transducer ET is sent to a demodulator DM whose output signal, representing the actual rotor position, is sent to transformer circuits T1 and T2 and to a circuit AS calculating the actual angular speed of rotor. The transformer circuit T1 also receives from current transducers C1, C2 two signals representing the actual currents feeding the stator S, and therefore the stator coordinates, and it operates by transforming the current values from stator coordinates into rotating coordinates, which are sent to proportional integrative regulators I1, I2. The proportional integrative regulator I1 also receives the output of a function generator FG, controlled by the output of the calculating circuit AS, which generates a signal depending on the machine speed. The proportional integrative regulator I2 also receives the output of another proportional integrative regulator I3 which, in turn, is controlled by the speed signal from circuit AS and by the signal of a circuit SE for the entry of the desired speed value. Finally, the output signals from both proportional integrative regulators I1 and I2, along with the output of demodulator DM, are sent to the transformer circuit T2, which operates by transforming the entered voltages from rotating coordinates into stator coordinates, and controls therewith the inverter circuit IC feeding the stator S of the machine.

Figure 2:
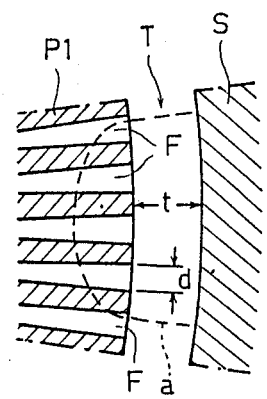
FIG. 2 shows on a larger scale the detail II of FIG. 1.
Figure 4:
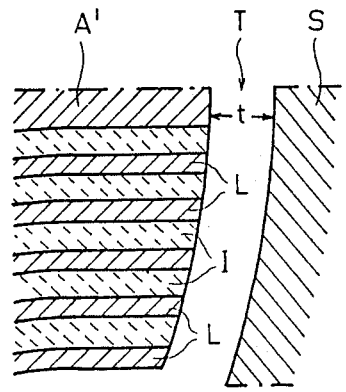
FIG. 4 shows on a larger scale the detail IV of FIG. 3.

In the drawing figures, T indicates the air gap existing between the inner surface of stator S and the skirt surface of rotor U; the thickness of this air gap T is shown as t in FIGS. 2 and 4.

With reference to FIGS. 1 and 2, rotor U is shown in a shape comprising two butterfly-like salient poles P1 and P2, diametrically opposite with respect to a shaft A which carries the rotor. The feature given by the invention to this rotor resides in that the poles P1 and P2 have in their surfaces facing the air gap T a number of little cavities, such as millings or bores F, which are better shown in FIG. 2, and form non-ferromagnetic material members which decrease the cross section of poles P1 and P2 available for passage of the magnetic flux. The cavities F occupy in their entirety at least 40% of the cross section of the poles in which they are hollowed. A size of cavities F which extend in a plane tangent to the air gap T (and more precisely their width, if the cavities are millings, or their diameter d, if circular bores are concerned) does not exceed five times the thickness t of air gap T.

The presence of cavities F has a twofold effect. Above all, in accordance with the cavities, the cross section of ferromagnetic material is reduced with respect to the corresponding cross section of the facing stator S, and therefore the density of magnetic induction flux lines which extend in the ferromagnetic material of rotor in the concerned region is much higher than the density of magnetic induction flux lines which extend in the facing stator. In order to obtain good performance and reduced heating, the magnetic induction generated within the stator should be such as to give rise to no saturation; for example, the induction may correspond to 0.7 times the saturation value of the material forming the stator. In the conditions referred to, the ferromagnetic material of the rotor which faces the stator is led to saturation, so that the rotor behaves to the flux variations as if their poles were formed by permanent magnets. On the other hand, the saturation of the ferromagnetic material of the rotor does not result in any drawbacks. This is due to the fact that there is a vectorial control (in amplitude and phase) of the current feeding the stator S; thanks to such a vectorial control the rotor is always excited in synchronous mode, so that the magnetic induction does not vary therein; it is only in the presence of variations of the magnetic induction that the saturation is detrimental. A saturation, even if only local, of the ferromagnetic material of the stator, on the contrary, would be detrimental because of the alternate variation of the magnetic induction in the stator. However, the above stated saturation of the ferromagnetic material of the rotor does not correspond, even locally, to any saturation of the ferromagnetic material of the stator. This is due to the fact that the dimension d of the cavities F does not exceed five times the thickness t of the air gap T. Thus the magnetic flux lines coming out with a practically uniform density from the stator S may deviate through the air gap T in order to arrive at the ferromagnetic parts of rotor R which are closer to the stator points from which the magnetic flux lines come out, without unfavorably affecting the uniform magnetization of the stator. This is not the case if the dimension d exceeds five times the thickness t of the air gap T: in such a case the magnetic flux lines within the stator are not more uniformly distributed and local saturation takes place.

In the saturation conditions, the second useful effect of the presence of cavities F is that they pose a high reluctance to the eddy magnetic circuits, such as that shown by broken line a, which aim to rise due to the distribution of the winding of the stator S. This allows a better utilization of the magnetic flux generated, and increases the power factor of the machine.

The embodiment according to FIGS. 1 and 2 is particularly economical; however, it does not allow realization of machines having a high ratio between generated couple and size of the machine. The embodiment according to FIGS. 3 and 4 is more costly but it allows realization of machines having high performance.

In this case the rotor has four poles, and it has a shaft A which projects to form a cross support with four arms A', between which axial laminations are located. The shaft A with the cross support A' may be made of conventional steel since, contrary to other known machines of this kind, there is no need for it not being ferromagnetic; on the contrary, its ferromagnetic character is useful, because the arms A' of the cross support are oriented along the two direct axes of the rotor and, when ferromagnetic, they contribute to the permeance along these directions. In the four quadrants defined by cross support A' there are inserted four curved axial laminations, whose general structure is per se well known for this type of machine, and which comprise a number of ferromagnetic sheets L alternate with non-ferromagnetic intercalary layers I. The feature according to the invention resides, in this case, in that the non-ferromagnetic intercalary layers I, instead of being limited to a minimal thickness as in the known structures, have a substantial thickness, at least $\frac{2}{3}$ of the thickness of the ferromagnetic sheets L; at the same time, the thickness of any non-ferromagnetic intercalary layer I does not exceed five times the thickness t of the machine air gap T.

The intercalary layers I may be realized in various manners. An embodiment comprises stacking ferromagnetic sheets L alternating with intercalary sheets I of a non ferromagnetic metal, for example aluminium, or with intercalary non-metallic sheets I formed for example by a suitable synthetic material. Another embodiment of the intercalary layers I comprises stacking the ferromagnetic sheets L in preestablished positions and then injecting in the intercalary spaces a non-ferromagnetic material, which may be for example aluminium or suitable synthetic material.

The non-ferromagnetic intercalary layers I cause a substantial decrease in the cross section of the ferromagnetic material of the rotor, in the sense wanted by the invention. Therefore, in this embodiment of the invention, like in the former one, to a non-saturating induction generated in the stator S corresponds in the rotor an induction capable of saturating the ferromagnetic sheets L. Moreover, due to the substantial thickness of the non-ferromagnetic intercalary layers I, the permeance along the quadrature axes is much more reduced than it can be in the known embodiments. The consequence is that, under some other conditions, a larger mechanical couple is generated. In this case too, the thickness of each non-ferromagnetic intercalary layer I not exceeding 5 times the thickness t of the machine air gap T allows the induction flux lines, which come out from stator S with practically uniform density, to deviate through the air gap in order to arrive to the more closer of the ferromagnetic sheets L, without giving rise to any noticeable local induction concentration in stator S. Contrary to the former embodiment, the presence of the non-ferromagnetic intercalary layers I in those regions of the rotor which face the air gap T opposes a high reluctance to the eddy magnetic circuits on the quadrature axis, even when there is no saturation, and therefore also when the machine is operating under conditions of weakened field.

The members B, which are located in the central part of the curved laminations L,I, define the interpolar spaces of the rotor, and they should be made of a non-ferromagnetic material; for the purposes of the invention it is immaterial whether these members are conductive or insulating. Members B may actively participate to the assembly of the rotor by keeping fixed to the cross support A' the laminations L,I. This may be made, in a manner per se well known (see for example the British Pat. No. 1,114,562), by means of bolts extending from the members B towards the axis of the rotor, and/or by means of flanges or end rings arranged to retain the members B. It is of advantage that, as it appears from FIG. 3, the arms A' of the cross support and, correspondingly, the laminations L,I are substantially curved like a quarter of a circle in their central portions and they are substantially straight in the lateral portions, which are nearly perpendicular to one another. Such a conformation confers a larger thickness to the non-ferromagnetic members B and allows a higher ratio between the permeance along the direct axes and the permeance along the quadrature axes, with the same length of the polar arc. It also ensures an increase in strength of the members B, which is useful when these members contribute to the assembly of the rotor structure.

As a consequence of the high rate of decrease in ferromagnetic section, in a rotor with axial lamination it is found of advantage, with respect to all various characteristics of the machine, to choose a large angular extension of the rotor poles. Therefore the angular extension of each pole, expressed in terms of electric angle, is preferably chosen of at least 2 radians.

A structure conceptually corresponding to the described one may be realized for machines having more than four poles, namely having 2n poles, where n is greater than 2, by providing onto the shaft A a number of 2n support arms A' and shaping the laminations along a curve which extends for 1/n angle of 180° and from both ends of which extend straight sections substantially parallel to the contiguous direct axes.

Figure 5:
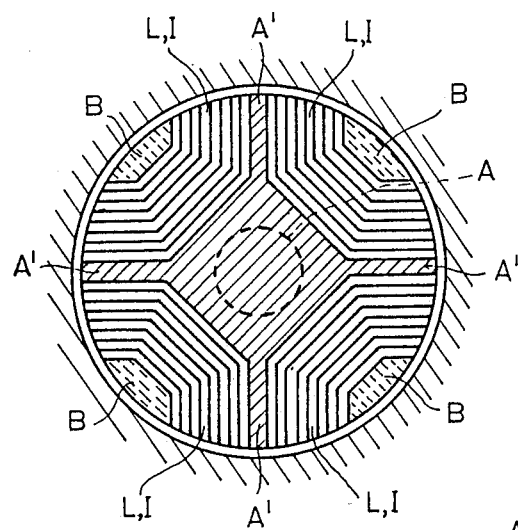
FIGS. 5 and 6 diagrammatically show two modifications to the embodiment according to FIG. 3.

However, it is not needed that the laminations have curved portions. On the contrary, due to manufacturing reasons it may be preferable that the laminations be given a polygonal shape, for example as shown in FIG. 5; the structure shown there may be considered as operationally equivalent to that according to FIG. 3.

Figure 6:
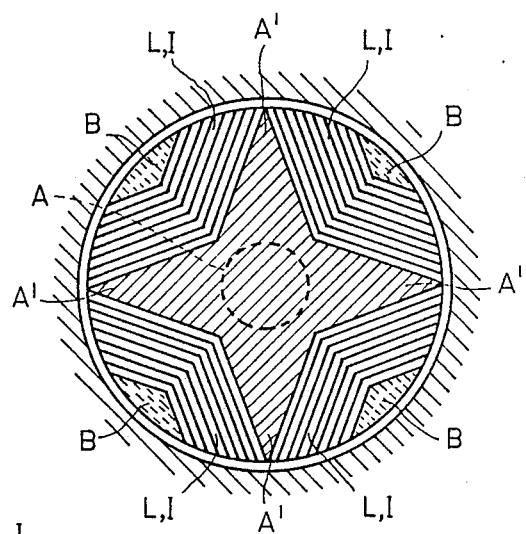

A constructive simplification may be realized by giving the laminations a dihedral form, as shown in FIG. 6. In this case the support arms A' of the shaft A form a stellar figure in their whole. Of course, also from the structures according to FIGS. 5 and 6 may be derived corresponding rotor structures for machines having more than four poles; thus, the structure according to FIG. 6 is assumed to be particularly suitable for machines having a high number of poles.

Figure 7:
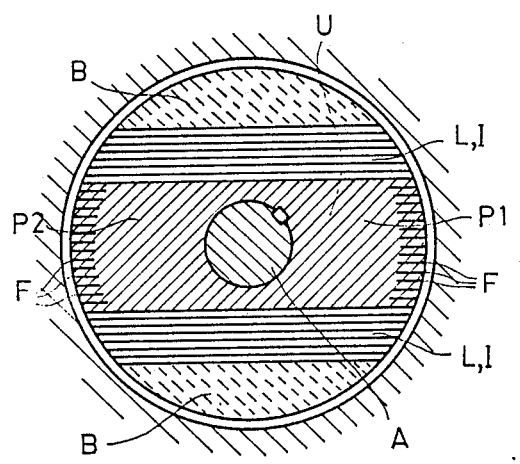
FIG. 7 diagrammatically shows a combined embodiment, wherein the decrease in section is carried out partially on massive parts and partially by means of axial lamination or division.

Finally, FIG. 7 shows how the features shown by FIG. 1 for a massive rotor may be combined with the features shown by FIGS. 3 to 6 for a rotor with axial lamination. Rotor U of FIG. 7 has two poles, and it shows a pair of massive salient poles P1 and P2 which have cavities F facing the air gap T, similarly to that shown in FIG. 1. Two laminations L,I, which in this case are planar, are applied at both sides of the salient poles P1 and P2, and they are retained by non-ferromagnetic members B which define the interpolar spaces. It should be understood that from the structure shown by FIGS. 1 and 7 for a rotor U having two poles, it is possible to derive corresponding structures for machines having more than two poles.

As it may be understood from the above, the association of two ideas forming the basis of the invention: that of using for a reluctance machine a vectorial control of the feed current, and that of decreasing in a substantial manner the cross section of the ferromagnetic material included within the rotor, in the stated conditions, leads to the possibility of realizing sturdy machines having a simple and economical construction, as well as high characteristics, which may be employed in applications for which the reluctance machines could not be suitable until now. In particular, useful applications of such machines may be foreseen as servomotors, as motors for machine tools, as driving motors for electrical vehicles and so on, to replace direct-current motors, brushless motors and other electric machines, with the particular advantage of having a rotor which is free from both windings and permanent magnets and is not subject to heating.

The embodiments of the machines according to the invention may substantially vary though respecting the stated conditions, and this allows realizing machines specifically suitable for different applications.

I claim:
1. A reluctance electric machine comprising
   (a) a stator having electric windings; and
   (b) a rotor having spaced poles and being inserted into said stator and spaced therefrom by an air gap, said rotor including axial laminations comprising
      (1) ferromagnetic sheets; and
      (2) non-ferromagnetic intercalary layers alternating with said ferromagnetic sheets in such a way that the cross section of said ferromagnetic sheets of said rotor at least in the vicinity of said air gap is decreased by said non-ferromagnetic intercalary layers, the ratio between the cross section of said ferromagnetic sheets and the cross section available for magnetic flux lines not exceeding 0.6, the thickness of each of said intercalary layers being at least ⅔ of the thickness of each of said ferromagnetic sheets, and the thickness of each of said intercalary layers not exceeding 5 times the thickness of said air gap.
2. A reluctance electric machine comprising
   (a) a stator having electric windings; and
   (b) a rotor having spaced poles and being inserted into said stator and spaced therefrom by an air gap, said rotor including
      (1) axial laminations comprising

(i) ferromagnetic sheets; and (ii) non-ferromagnetic intercalary layers alternating with said ferromagnetic sheets in such a way that the cross section of said ferromagnetic sheets of said rotor at least in the vicinity of said air gap is decreased by said non-ferromagnetic intercalary layers, the ratio between the cross section of said ferromagnetic sheets and the cross section available for magnetic flux lines not exceeding 0.6, the thickness of each of said intercalary layers being at least ⅔ of the thickness of each of said ferromagnetic sheets, and the thickness of each of said intercalary layers not exceeding 5 times the thickness of said air gap;

(c) a shaft of ferromagnetic material, said shaft having a plurality of radial projections in the shape of arms supporting said laminations; and (d) members of non-ferromagnetic material arranged in the spaces between said poles.

3. An electric machine as set forth in claim 2, wherein said rotor has 2n poles, said shaft has 2n projections in the shape of supporting arms, and said projections and the laminations each have, in section, a central portion curved substantially through 1/n of an angle of 180°, and lateral portions projecting from said central portion, said lateral portions being substantially straight and being nearly parallel to the direct axes of the rotor.

4. An electric machine as set forth in claim 2, wherein said rotor has 2n poles, said shaft has 2n projections in the shape of supporting arms, and said projections and the laminations each have, in section, a central portion of substantially polygonal shape and lateral portions projecting from said central portion, said lateral portions being substantially straight and being nearly parallel to the direct axes of the rotor.

5. An electric machine as set forth in claim 2, wherein said rotor has 2n poles, said shaft has 2n projections forming a star-shaped figure having 2n supporting arms, and each lamination has the shape of a dihedron whose vertex, in section, is located on a quadrature axis and whose sides are oriented towards the direct axes of the rotor.

6. An electric machine as set forth in claim 2, wherein each rotor pole has a length, expressed in terms of electric angle, of at least 2 radians.

* * * * *